(12) United States Patent
Endo

(10) Patent No.: US 6,489,401 B2
(45) Date of Patent: Dec. 3, 2002

(54) ONE-PIECE GOLF BALL

(75) Inventor: Seiichiro Endo, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/859,455

(22) Filed: May 18, 2001

(65) Prior Publication Data
US 2002/0016221 A1 Feb. 7, 2002

(30) Foreign Application Priority Data

May 19, 2000 (JP) ........................................ 2000-147967
Dec. 28, 2000 (JP) ........................................ 2000-401831

(51) Int. Cl.$^7$ ............................. A63B 37/06; C08L 9/00
(52) U.S. Cl. ...................... 525/193; 525/274; 525/301; 525/236; 473/371; 473/372
(58) Field of Search ................................ 525/193, 274, 525/301, 236; 473/371, 372

(56) References Cited

U.S. PATENT DOCUMENTS

| 4,683,257 A | * | 7/1987 | Kakiuchi |
| 4,929,678 A |   | 5/1990 | Hamada et al. |
| 4,974,852 A |   | 12/1990 | Hiraoka et al. |
| 5,082,285 A | * | 1/1992 | Hamada |
| 6,315,679 B1 | * | 11/2001 | Sano |

FOREIGN PATENT DOCUMENTS

| JP | 06-079018 | * | 3/1994 |
| JP | A11244418 |   | 9/1999 |

* cited by examiner

Primary Examiner—David J. Buttner
(74) Attorney, Agent, or Firm—Birch, Stewart, Kolasch & Birch, LLP

(57) ABSTRACT

The present invention provides a one-piece golf ball having good durability, good shot feel and excellent flight performance. The present invention relates to a one-piece golf ball formed by vulcanizing and press molding a rubber composition comprising a base rubber, co-crosslinking agent, organic peroxide and inorganic filler, wherein
the base rubber comprises
(1) polybutadiene (A) having a weight average molecular weight (Mw) of $55 \times 10^4$ to $69 \times 10^4$ and a number average molecular weight (Mn) of $10 \times 10^4$ to $20 \times 10^4$, and
(2) polybutadiene (B) having a weight average molecular weight (Mw) of $70 \times 10^4$ to $120 \times 10^4$ and a number average molecular weight (Mn) of $13 \times 10^4$ to $25 \times 10^4$, in a weight ratio (A/B) of 3/97 to 70/30.

3 Claims, No Drawings

ONE-PIECE GOLF BALL

FIELD OF THE INVENTION

The present invention relates to a one-piece golf ball. More particularly, it relates to a one-piece golf ball having good durability, good shot feel and excellent flight performance.

BACKGROUND OF THE INVENTION

Golf balls are typically classified into two types, that is, golf balls for round games and golf. balls for driving ranges. It is difficult to say that performance, which is required for these two types of golf balls, is the same with each other. The performance required for the golf ball for round games is good shot feel, excellent flight performance, good durability and the like. If the golf balls for round games are used as a golf ball for driving ranges, good shot feel and excellent flight performance are maintained, but the durability is very poor as a golf ball for driving ranges, which is repeatedly hit. Therefore, at driving ranges, the durability is regarded as more important than the shot feel and flight performance, and golf balls having much better durability than that of the golf balls for round games is used.

In the golf balls for driving ranges, there are golf balls having low rebound characteristics, low trajectory and high trajectory, golf balls for using on the water and the like other than a standard ball depending on the extent of the driving ranges, the height of net and the like. There are various golf balls, such as one-piece golf ball, two-piece golf ball and the like, depending on the structure of the golf ball. At present, one-piece solid golf ball, which is standard ball, is mainly used as golf balls for driving ranges.

Recently, since performance as good as golf balls for round games, such as shot feel, has been required for golf balls for driving ranges, good shot feel and excellent flight performance have been required for the one-piece golf ball having excellent durability. However, when softening the golf ball in order to improve the shot feel or improving the flight performance, the durability is degraded. It is very difficult to improve shot feel and flight performance, while maintaining excellent durability.

A one-piece solid golf ball, of which the hardness distribution is adjusted so that an outer portion is hard and an inner portion is soft, is proposed (for example, Japanese Patent Kokai Publication No. 244418/1999 and the like). In Japanese Patent Kokai Publication No. 244418/1999, a one-piece solid golf ball, of which the hardness distribution is adjusted so that an outer portion is hard and an inner portion is soft, and the deformation amount is adjusted to a specific range, is described. However, in the golf ball, the shot feel is improved, but it is problem that excellent durability is not maintained.

Since it is required for the golf ball for driving ranges to be low cost, it is difficult to use expensive materials in order to solve the problem. Therefore one-piece solid golf ball, which is superior in all of durability, shot feel and flight performance, has not been yet obtained.

OBJECTS OF THE INVENTION

A main object of the present invention is to provide a one-piece golf ball having good durability, good shot feel and excellent flight performance.

According to the present invention, the object described above has been accomplished by using two types of polybutadiene having a specific weight average molecular weight and number average molecular weight in a specific weight ratio as a base rubber in a rubber composition comprising a base rubber, co-crosslinking agent, organic peroxide, inorganic filler and the like, thereby providing a one-piece golf ball having good durability, good shot feel and excellent flight performance.

SUMMARY OF THE INVENTION

The present invention provides a one-piece golf ball formed by vulcanizing and press molding a rubber composition comprising a base rubber, co-crosslinking agent, organic peroxide and inorganic filler, wherein the base rubber comprises
(1) polybutadiene (A) having a weight average molecular weight (Mw) of $55 \times 10^4$ to $69 \times 10^4$ and a number average molecular weight (Mn) of $10 \times 10^4$ to $20 \times 10^4$, and
(2) polybutadiene (B) having a weight average molecular weight (Mw) of $70 \times 10^4$ to $120 \times 10^4$ and a number average molecular weight (Mn) of $13 \times 10^4$ to $25 \times 10^4$, in a weight ratio (A/B) of 3/97 to 70/30.

In order to put the present invention into a more suitable practical application, it is desired that
the polybutadiene (A) have Mw/Mn of 2.0 to 4.0, and the polybutadiene (B) have Mw/Mn of 4.2 to 5.0, and
the golf ball have a center hardness (C) in JIS-C hardness of 55 to 63, a surface hardness (D) in JIS-C hardness of 75 to 88 and a hardness difference (D−C) of 18 to 25.

The one-piece golf ball of the present invention is formed from vulcanized integrally molded article of rubber composition. The rubber composition comprises a base rubber, co-crosslinking agent, organic peroxide, inorganic filler and the like.

It is required for the base rubber used in the present invention to comprise
(1) polybutadiene (A) having a weight average molecular weight (Mw) of $55 \times 10^4$ to $69 \times 10^4$ and a number average molecular weight (Mn) of $10 \times 10^4$ to $20 \times 10^4$, and
(2) polybutadiene (B) having a weight average molecular weight (Mw) of $70 \times 10^4$ to $120 \times 10^4$ and a number average molecular weight (Mn) of $13 \times 10^4$ to $25 \times 10^4$, in a weight ratio (A/B) of 3/97 to 70/30.

It is required for the polybutadiene (A) to have Mw of $55 \times 10^4$ to $69 \times 10^4$, preferably $55 \times 10^4$ to $65 \times 10^4$, more preferably $57 \times 10^4$ to $65 \times 10^4$. When the Mw is smaller than $55 \times 10^4$, the rebound characteristics are degraded. On the other hand, when the Mw is larger than $69 \times 10^4$, the processability is degraded. It is required for the polybutadiene (A) to have Mn of $10 \times 10^4$ to $20 \times 10^4$, preferably $12 \times 10^4$ to $16 \times 10^4$, more preferably $13 \times 10^4$ to $16 \times 10^4$. When the Mn is smaller than $10 \times 10^4$, the rebound characteristics are degraded. On the other hand, when the Mn is larger than $20 \times 10^4$, the processability is degraded. It is desired for the polybutadiene (A) to have Mw/Mn of 2.0 to 4.0. When the Mw/Mn is larger than 4.0, the rebound characteristics are degraded. On the other hand, when the Mw/Mn is smaller than 2.0, the processability is degraded. Therefore the Mw/Mn is within the range of preferably 2.5 to 4.0, more preferably 2.7 to 4.0, most preferably 3.0 to 4.0.

It is required for the polybutadiene (B) to have Mw of $70 \times 10^4$ to $120 \times 10^4$, preferably $75 \times 10^4$ to $110 \times 10^4$, more preferably $80 \times 10^4$ to $110 \times 10^4$. When the Mw is smaller than $70 \times 10^4$, the rebound characteristics are degraded. On the other hand, when the Mw is larger than $120 \times 10^4$, the processability is degraded. It is required for the polybutadiene (A) to have Mn of $13 \times 10^4$ to $25 \times 10^4$, preferably $17 \times 10^4$ to $25 \times 10^4$, more preferably $17 \times 10^4$ to $24 \times 10^4$. When the Mn is smaller than $13 \times 10^4$, the rebound characteristics are degraded. On the other hand, when the Mn is larger than $25\times10^4$, the processability is degraded. It is desired for the polybutadiene (A) to have Mw/Mn of 4.2 to 5.0. When the Mw/Mn is larger than 5.0, the rebound characteristics are degraded. On the other hand, when the Mw/Mn is smaller than 4.2, the processability is degraded. Therefore the Mw/Mn is within the range of preferably 4.2 to 4.8, more preferably 4.2 to 4.5, most preferably 4.3 to 4.8.

It is desired for a ratio ($Mw_A/Mw_B$) of the Mw of the polybutadiene (A): ($Mw_A$) to the Mw of the polybutadiene (B): ($Mw_B$) to be within the range of 0.45 to 0.95, preferably 0.50 to 0.90. When the $Mw_A/Mw_B$ is smaller than 0.45, the processability and durability are degraded. On the other hand, when the $Mw_A/Mw_B$ is larger than 0.95, the rebound characteristics are degraded. It is desired for a ratio ($Mn_A/Mn_B$) of the Mn of the polybutadiene (A): ($Mn_A$). to the Mn of the polybutadiene (B): ($Mn_B$) to be within the range of 0.50 to 1.30, preferably 0.55 to 1.20. When the $Mn_A/Mn_B$ is smaller than 0.50, the processability is degraded. On the other hand, when the $Mn_A/Mn_B$ is larger than 1.30, the degraded.

Generally, when the Mw of polybutadiene rubber is large, the rebound characteristics are improved, but the processability tends to be degraded. On the other hand, when the Mw of polybutadiene rubber is small, the processability is good, but the rebound characteristics tend to be degraded. If the polybutadiene (A) is only used, the processability is good, but the rebound characteristics are degraded. If the polybutadiene (B) is only used, the rebound characteristics are improved, but the processability is degraded. A one-piece solid golf ball having good rebound characteristics, good processability and excellent durability can be obtained by using the polybutadiene (A) and the polybutadiene (B) together.

It is required for a weight ratio (A/B) of the polybutadiene (A) to the polybutadiene (B) to be within the range of 3/97 to 70/30, preferably 5/95 to 70/30, more preferably 5/95 to 50/50. When the amount of the polybutadiene (A) is smaller than 3% by weight or that of the polybutadiene (B) is larger than 97% by weight, the durability is degraded. On the other hand, when the amount of the polybutadiene (A) is larger than 70% by weight, the processability is degraded and the flight performance is degraded. When the amount of the polybutadiene (B) is smaller than 30% by weight, the rebound characteristics are degraded. The polybutadiene (A) and the polybutadiene (B) may be respectively comprised by one polybutadiene or the mixture of two or more polybutadienes as long as the above requisites are fulfilled.

The "processability" as used herein is determined by evaluating the winding of the rubber composition on the mixing roll during mixing, and the chapping of the surface of plug when extruding the plug (unvulcanized molded article) used at molding. When the processability is poor, it is difficult to wind the rubber composition on the mixing roll, the surface of plug is chap, the dispersibility of formulation materials is poor, and the performance of the resulting golf ball is uneven. In addition, the appearance is poor because of the chapping of the surface of plug, or the durability is degraded because the release agent gets into the chap surface of plug.

The base rubber may only consist of the polybutadiene rubber (A) and polybutadiene rubber (B), but may be optionally mixed with natural rubber, polyisoprene rubber, styrene-butadiene rubber, ethylene-propylene-diene rubber (EPDM) and the like. If used, it is preferable to adjust the amount of the rubber other than the polybutadiene so that the total amount of the polybutadiene rubber (A) and polybutadiene rubber (B) is within the range of not less than 80% by weight, preferably not less than 90% by weight, based on the total weight of the base rubber. When the total amount of the polybutadiene rubber (A) and polybutadiene rubber (B) is within the range of less than 80% by weight, the rebound characteristics are degraded, or the processability is degraded.

Examples of the co-crosslinking agents include α,β-unsaturated carboxylic acids having 3 to 8 carbon atoms (e.g. acrylic acid, methacrylic acid, etc.) or a monovalent or divalent metal salt such as zinc or magnesium salt thereof, polyfunctional acrylic esters such as trimethylolpropane triacrylate, polyfunctional methacrylic esters such as trimethylpropane trimethacrylate, and the like. The amount of the co-crosslinking agent is from 19 to 29 parts by weight, preferably from 22 to 26 parts by weight, based on 100 parts by weight of the base rubber. When the amount of the co-crosslinking agent is larger than 29 parts by weight, the core is too hard, and the shot feel of the resulting golf ball is poor. On the other hand, when the amount of the co-crosslinking agent is smaller than 19 parts by weight, it is required to increase the amount of the organic peroxide in order to obtain the desired hardness, and high rebound characteristics of the resulting golf ball are not obtained.

Examples of the organic peroxides, which act as a crosslinking agent or curing agent, include, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide, 2,2-di(t-butylperoxy)butane, t-butyl perbenzoate and the like. The preferred organic peroxide is dicumyl peroxide. The amount of the organic peroxide is 0.1 to 3.0 parts by weight, preferably 1.5 to 2.0 parts by weight, based on 100 parts by weight of the base rubber. When the amount of the organic peroxide is smaller than 0.1 parts by weight, the core is too soft, and high rebound characteristics are not obtained. On the other hand, when the amount of the organic peroxide is larger than 3.0 parts by weight, it is required to decrease the amount of the co-crosslinking agent in order to obtain the desired hardness, and high rebound characteristics are not obtained. When these organic peroxides are heated, they decompose to form radicals, which increase the degree of crosslinking between the aforedescribed co-crosslinking agents and base rubber, and enhance the rebound characteristics.

Examples of the fillers include inorganic fillers such as zinc oxide, silicon oxide, barium sulfate, calcium carbonate, aluminum silicate and mixtures thereof. The inorganic fillers are used as a reinforcing agent, which improves the hardness or strength, or a specific gravity (weight) adjuster. However, the preferred filler is zinc oxide, which functions as a vulcanization aid. The amount of the filler is 10 to 60 parts by weight, preferable 12 to 50 parts by weight, based on 100 parts by weight of the base rubber. When the amount of the filler is larger than 60 parts by weight, the weight ratio of the rubber component in the resulting golf ball is small, and the rebound characteristics are degraded. On the other hand, when the amount of the filler is smaller than 10 parts by weight, it is difficult to adjust the weight of the resulting golf ball, or the durability is degraded.

Where appropriate, it is possible to compound a component which is typically used in the manufacture of one-piece solid golf ball together with the rubber composition for the one-piece solid golf ball of the present invention; pigments such as titanium dioxide and the like, and other additives such as antioxidants, peptizing agents and the like.

The one-piece solid golf ball of the present invention can be obtained by mixing the rubber composition with a mixer such as a mixing roll and the like, and then press-molding and vulcanizing the mixture under applied heat in a mold. The vulcanizing, of which the condition is not limited, is conducted at 130 to 240° C. and 2.9 to 11.8 MPa for 15 to 60 minutes. The vulcanizing may be conducted in two or more stages of the temperature.

At the time of molding the golf ball, many depressions called "dimples" may be optionally formed on the surface of the golf ball. Furthermore, paint finishing or marking with a stamp may be optionally provided after the cover is molded for commercial purposes.

In the one-piece solid golf ball of the present invention, it is desired to have a center hardness in JIS-C hardness (C) of 55 to 63, preferably 56 to 62, more preferably 57 to 61. When the center hardness is smaller than 55, the durability is degraded. On the other hand, when the center hardness is larger than 63, the shot feel is poor.

In the one-piece solid golf ball of the present invention, it is desired to have a surface hardness in JIS-C hardness (D) of 75 to 88, preferably 75 to 85. When the center hardness is smaller than 75, the shot feel is heavy and poor, and the flight performance is degraded. On the other hand, when the center hardness is larger than 88, the durability is degraded. The term "center hardness" as used herein refers to the hardness, which is determined by cutting the resulting golf ball into two equal parts and then measuring a JIS-C hardness at its center point in section. The term "surface hardness" as used herein refers to the hardness, which is determined by measuring a JIS-C hardness at the surface of the resulting golf ball.

In the one-piece solid golf ball of the present invention, it is desired to have a hardness difference (D−C) between the center hardness in JIS-C hardness (C) and the surface hardness in JIS-C hardness (D) of 18 to 25, preferably 19 to 24. When the hardness difference (D−C) is smaller than 18, the shot feel is heavy and poor and the flight performance is degraded. On the other hand, when the hardness difference is larger than 25, the durability is degraded.

In the present invention, the core has a diameter of 36.5 to 42.5 mm, preferably 36.7 to 40.8 mm. When the diameter of the core is smaller than 36.5 mm, the thickness of the cover is large, and the impact force at the time of hitting is large. In addition, the volume of the core is small, and the rebound characteristics are degraded. On the other hand, when the diameter of the core is larger than 42.5 mm, the thickness of the cover is small, and the durability is degraded.

Generally, polybutadiene rubber having large Mw, such as the polybutadiene rubber (B) is used in larger amount in order to improve the rebound characteristics. Thereby, the difference between the center hardness and surface hardness is large, and the shot feel is improved, but the durability is degraded with using only the polybutadiene rubber (B). The one-piece solid golf ball having excellent rebound characteristics (flight performance), excellent durability and excellent processability is obtained by using a combination of the polybutadiene (A) and polybutadiene (B). In addition, the shot feel is good by controlling the hardness difference to a specified range.

The weight of the golf ball is limited to the range of not more than 45.92 g when it is large size golf ball, but the lower limit is not limited. The one-piece solid golf ball of the present invention has a weight of 44.0 to 45.8 g, preferably 44.2 to 45.8 g. When the weight of the golf ball is smaller than 44.0 g, the golf ball loses inertia on a flight, and stalls, which reduces the flight distance. On the other hand, when the weight of the golf ball is larger than 45.8 g, the shot feel is heavy and poor.

The diameter of the one-piece golf ball of the present invention can be within the range of 41.0 to 44.0 mm, but it is preferably within the range of not less than 42.67 mm in accordance with the regulations for large size golf balls, typically it is about 42.75 mm.

EXAMPLES

The following Examples and Comparative Examples further illustrate the present invention in detail but are not to be construed to limit the scope of the present invention.

(Examples 1 to 6 and Comparative Examples 1 to 5)

The rubber compositions having the formulation shown in Table 1 were mixed, and the mixtures were then press molded at the vulcanization condition shown in Table 3 (Examples) and Table 4 (Comparative Examples) in a mold, which is composed of an upper mold and a lower mold having a hemispherical cavity, to obtain one-piece golf balls having a diameter 42.75 mm. The Mw, Mn and content of cis-1,4-butadiene of the polybutadiene rubbers used are shown in Table 2.

TABLE 1

| Composition | (parts by weight) | | | | | | | |
| --- | --- | --- | --- | --- | --- | --- | --- | --- |
|  | I | II | III | IV | V | VI | VII | VIII |
| BR11 *1 | 70 | — | 30 | 70 | 100 | — | 20 | — |
| BR18 *2 | — | 95 | — | — | — | 100 | — | 50 |
| BR230 *3 | 30 | 5 | 70 | 30 | — | — | 80 | 50 |
| methacrylic acid | 24 | 24 | 24 | 24 | 24 | 24 | 24 | 24 |
| Zinc oxide | 24 | 24 | 24 | 19 | 24 | 24 | 24 | 24 |
| Calcium carbonate | 2 | 2 | 2 | 2 | 2 | 2 | 2 | 2 |
| Dicumul peroxide | 0.7 | 0.7 | 0.7 | 0.7 | 0.7 | 0.7 | 0.7 | 0.7 |

*1: Polybutadiene rubber, which is commercially available from JSR Co., Ltd. under the trade name of "BR11"
*2: Polybutadiene rubber, which is commercially available from JSR Co., Ltd. under the trade name of "BR18"
*3: Polybutadiene rubber, which is commercially available from Ube Industries, Ltd. under the trade name of "UBEPOL BR230"

TABLE 2

| Polybutadiene rubber | Mw* | Mn* | Mw/Mn | Content of cis-1,4-butadiene |
| --- | --- | --- | --- | --- |
| BR11 *1 | $82 \times 10^4$ | $17 \times 10^4$ | 4.8 | 97.7% |
| BR18 *2 | $100 \times 10^4$ | $23 \times 10^4$ | 4.3 | 97.8% |
| BR230 *3 | $63 \times 10^4$ | $16 \times 10^4$ | 3.9 | 97.8% |

*Mw (weight average molecular weight) and Mn (number average molecular weight) is determined by measuring with a gel permeation chromatography (GPC) using tetrahydrofuran as a organic solvent for elute and calibrating with standard polystyrene.

With respect to the resulting one-piece solid golf all, the weight, center hardness C and surface hardness D in JIS-C hardness, flight distance, durability and shot feel were measured or evaluated, and the results are shown in Table 3 (Examples) and Table 4 (Comparative Examples). The hardness difference (D−C) was calculated from the center hardness C and surface hardness D. The results are shown in the same Tables. The test method is as follows.

(Test Method)

(1) Flight Distance

After a No.1 wood club (a driver) having metal head was mounted to a swing robot manufactured by True Temper Co. and the resulting golf ball was hit at a head speed of 40 m/second, the flight distance was measured. As the flight distance, carry that is a distance to the dropping point of the hit golf ball and total that is a distance to the stop point of the hit golf ball were measured. The measurement was conducted 5 times for each golf ball (n=5), and the average is shown as the result of the golf ball.

(2) Durability

A No.1 wood club (W#1, a driver) having metal head was mounted to a swing robot manufactured by True Temper Co. and the resulting golf ball was hit at a head speed of 45 m/second to strike against an impact board, repeatedly. The durability is determined by measuring the number of hit until the cover of the golf ball cracks. The larger the number is, the better durability the golf ball has.

(3) Shot Feel

The shot feel of the golf ball is evaluated by 10 golfers according to a practical hitting test using a driver having metal head. The evaluation criteria are as follows. The results shown in the Tables below are based on the fact that the most golfers evaluated with the same criterion about shot feel.

oo: The golfers felt that the golf ball has very small impact force, and soft and good shot feel.
    o: The golfers felt that the golf ball has small impact force, and good shot feel so that it has rebound characteristics.
    x: The golfers felt that the golf ball has large impact force, and hard and poor shot feel.

TABLE 3

(Test results)

| | Example No. | | | | | |
|---|---|---|---|---|---|---|
| | 1 | 2 | 3 | 4 | 5 | 6 |
| Composition | I | I | II | III | IV | VIII |
| Vulcanization condition | | | | | | |
| Time (min) | 165 | 175 | 175 | 175 | 155 | 175 |
| Temp. (° C.) | 20 | 20 | 20 | 20 | 20 | 20 |
| Ball weight (g) | 45.4 | 45.4 | 45.4 | 45.4 | 44.2 | 45.4 |
| Hardness (JIS-C) | | | | | | |
| Center hardness (C) | 66 | 58 | 57 | 61 | 68 | 57 |
| Surface hardness (D) | 75 | 80 | 81 | 79 | 75 | 80 |
| Difference (D − C) | 9 | 22 | 24 | 18 | 7 | 23 |
| Flight distance (Driver, 40 m/sec) | | | | | | |
| Carry (m) | 166.5 | 168.0 | 168.5 | 167.5 | 165.0 | 168.5 |
| Total (m) | 172.0 | 173.0 | 173.5 | 172.0 | 171.5 | 173.0 |
| Durability | 610 | 550 | 490 | 560 | 510 | 500 |
| Shot feel | o | oo | oo | oo | o | oo |

TABLE 4

| | Comparative Example No. | | | | |
|---|---|---|---|---|---|
| | 1 | 2 | 3 | 4 | 5 |
| Composition | V | V | VI | VII | V |
| Vulcanization condition | | | | | |
| time (min) | 165 | 155 | 175 | 165 | 175 |
| temp. (° C.) | 20 | 20 | 20 | 20 | 20 |
| Ball weight (g) | 45.4 | 45.4 | 45.4 | 45.4 | 45.4 |
| Hardness (JIS-C) | | | | | |
| Center hardness (C) | 66 | 72 | 57 | 66 | 58 |
| Surface hardness (D) | 76 | 74 | 83 | 75 | 83 |
| Difference (D − C) | 10 | 2 | 26 | 9 | 25 |
| Flight distance (Driver, 40 m/sec) | | | | | |
| Carry (m) | 166.5 | 164.5 | 168.0 | 160.0 | 168.0 |
| Total (m) | 171.5 | 169.5 | 171.5 | 164.5 | 171.0 |
| Durability | 350 | 480 | 280 | 600 | 290 |
| Shot feel | o | x | oo | o | oo |

As is apparent from the results of Tables 3 and 4, the one-piece solid golf balls of the present invention of Examples 1 to 6 as compared with the golf balls of Comparative Examples 1 to 5 have excellent durability, long flight distance and good shot feel. The golf balls of Examples 1 and 5 had higher center hardness C and smaller hardness difference (D−C) than the golf balls of the other Examples. Although the golf balls of Examples 1 and 5 had better shot feel than the golf balls of the Comparative Examples, they have slightly poor shot feel as compared with the golf balls of the other Examples.

On the other hand, in the golf ball of Comparative Example 1, only the polybutadiene (B) (having higher molecular weight) was used, and the durability was poor. In addition, the center hardness C was high and the hardness difference (D−C) was small, and the shot feel is slightly poor as compared with the golf balls of Examples 2 to 4 and 6. In the golf ball of Comparative Example 2, only the polybutadiene (B) (having higher molecular weight) was used, and the durability was poor. In addition, the center hardness C was high and the hardness difference (D−C) was small, and the shot feel is poor.

In the golf ball of Comparative Example 3, only the polybutadiene (B) (having higher molecular weight) was used, and the durability was poor. In the golf ball of Comparative Example 4, the amount of the polybutadiene (A) (having lower molecular weight) was large and the amount of the polybutadiene (B) (having higher molecular weight) was small, and the rebound characteristics are degraded, which largely reduces the flight distance. In the golf ball of Comparative Example 5, only the polybutadiene (B) (having higher molecular weight) was used, and the durability was poor.

What is claimed is:

1. A one-piece golf ball formed by vulcanizing and press molding a rubber composition comprising a base rubber, co-crosslinking agent, organic peroxide and inorganic filler, wherein the base rubber comprises
(1) polybutadiene (A) having a weight average molecular weight (Mw) of $55 \times 10^4$ to $69 \times 10^4$ and a number average molecular weight (Mn) of $10 \times 10^4$ to $20 \times 10^4$, and
(2) polybutadiene (B) having a weight average molecular weight (Mw) of $70 \times 10^4$ to $120 \times 10^4$ and a number average molecular weight (Mn) of $13 \times 10^4$ to $25 \times 10^4$, in a weight ratio (A/B) of 3/97 to 70/30.

2. The one-piece golf ball according to claim 1, wherein the polybutadiene (A) has Mw/Mn of 2.0 to 4.0 and the polybutadiene (B) has Mw/Mn of 4.2 to 5.0.

3. The one-piece golf ball according to claim 1, wherein the golf ball has a center hardness (C) in JIS-C hardness of 55 to 63, a surface hardness (D) in JIS-C hardness of 75 to 88 and a hardness difference (D−C) of 18 to 25.

* * * * *